United States Patent [19]

Jelsma

[11] E Patent Number: Re. 33,660

[45] Reissued Date of Patent: Aug. 13, 1991

[54] APPARATUS FOR DRILLING A CURVED BOREHOLE

[75] Inventor: Henk H. Jelsma, Spring, Tex.

[73] Assignee: Baroid Technology, Houston, Tex.

[21] Appl. No.: 530,816

[22] Filed: May 30, 1990

Related U.S. Patent Documents

Reissue of:

[64] Patent No.: 4,880,067
Issued: Nov. 14, 1989
Appl. No.: 156,831
Filed: Feb. 17, 1988

[51] Int. Cl.[5] ..... E21B 7/06; E21B 17/20

[52] U.S. Cl. ..... 175/107; 175/61; 175/73; 175/320

[58] Field of Search ..... 175/61, 45, 73, 76, 175/79, 89, 107, 101, 92, 320, 324, 325

[56] References Cited

U.S. PATENT DOCUMENTS

| | | | |
|---|---|---|---|
| 2,336,338 | 12/1943 | Zublin | 175/75 |
| 2,687,282 | 8/1954 | Sanders | 175/320 X |
| 2,778,603 | 1/1957 | McCune | 175/314 |
| 4,042,046 | 8/1977 | Capoccia | 175/73 |
| 4,143,722 | 3/1979 | Driver | 175/95 |
| 4,227,584 | 10/1980 | Driver | 175/95 |
| 4,361,193 | 11/1982 | Gravely | 175/61 |
| 4,432,423 | 2/1984 | Lyons | 175/75 |
| 4,442,908 | 4/1984 | Steenbock | 175/73 X |
| 4,446,932 | 5/1984 | Hipp | 175/61 X |
| 4,577,701 | 3/1986 | Dellinger | 175/61 |
| 4,693,327 | 9/1987 | Dickinson et al. | 175/61 |

*Primary Examiner*—Stephen J. Novosad

[57] ABSTRACT

A non-rotating drill string is formed from a plurality of independent, cylindrical sections pivotally connected together by a latch mechanism. The adjacent ends are partially beveled such that the sections can bend in a single direction. Means are disclosed for varying the effect of the beveled surfaces, thus controlling the angle of bend for a given one of the sections. A downhole mud motor (PDM) drives the drill bit through the use of a flexible drive shaft running through the center of a metal-lined, neoprene drilling fluid hose which runs through the interior of the independent cylindrical sections. The total curvature of the borehole drilled by the system equals the sum of the angles of bend between the individual sections.

17 Claims, 7 Drawing Sheets

APPARATUS FOR DRILLING A CURVED BOREHOLE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates, generally, to a method and apparatus for drilling a curved borehole and, specifically, to a method and apparatus for drilling a curved borehole while presetting the amount of angle building in the curvature of such borehole.

2. Description of the Background

The prior art has typically involved the rotation of the drill string and used, for example, bent subs to control the curvature of the borehole. Other prior art methods and apparatus have involved attempts to control the curvature through the controlled angling of the drill bit and/or the controlled angling or bending of the downhole mud motor used to rotate the drill bit.

SUMMARY OF THE INVENTION

The invention comprises a new and improved method and apparatus which utilizes a plurality of independent sections in a drill string to drill a curved borehole, wherein each of said sections has an ability to bend in only one direction. The sections are pivotally connected together.

As an additional feature of the invention, the angle through which an individual section can bend is adjustable.

As yet another feature, the drill string is formed with a plurality of such sections, with the total of the individual angles between sections being equal to the total degree of curvature of the drilled borehole.

As still another feature of the invention, a downhole mud motor drives a drill bit through the use of a flexible drive shaft running through a flexible drilling fluid hose passing through the interior of the independent sections.

As yet another advantage of the invention, the drill string made up of the individual sections is caused to be deflected by a diverter shoe in the well bore having the same angle and direction of curvature as that of the desired angle of curved borehole.

DESCRIPTION OF THE PREFERRED EMBODIMENT

Figure 1:
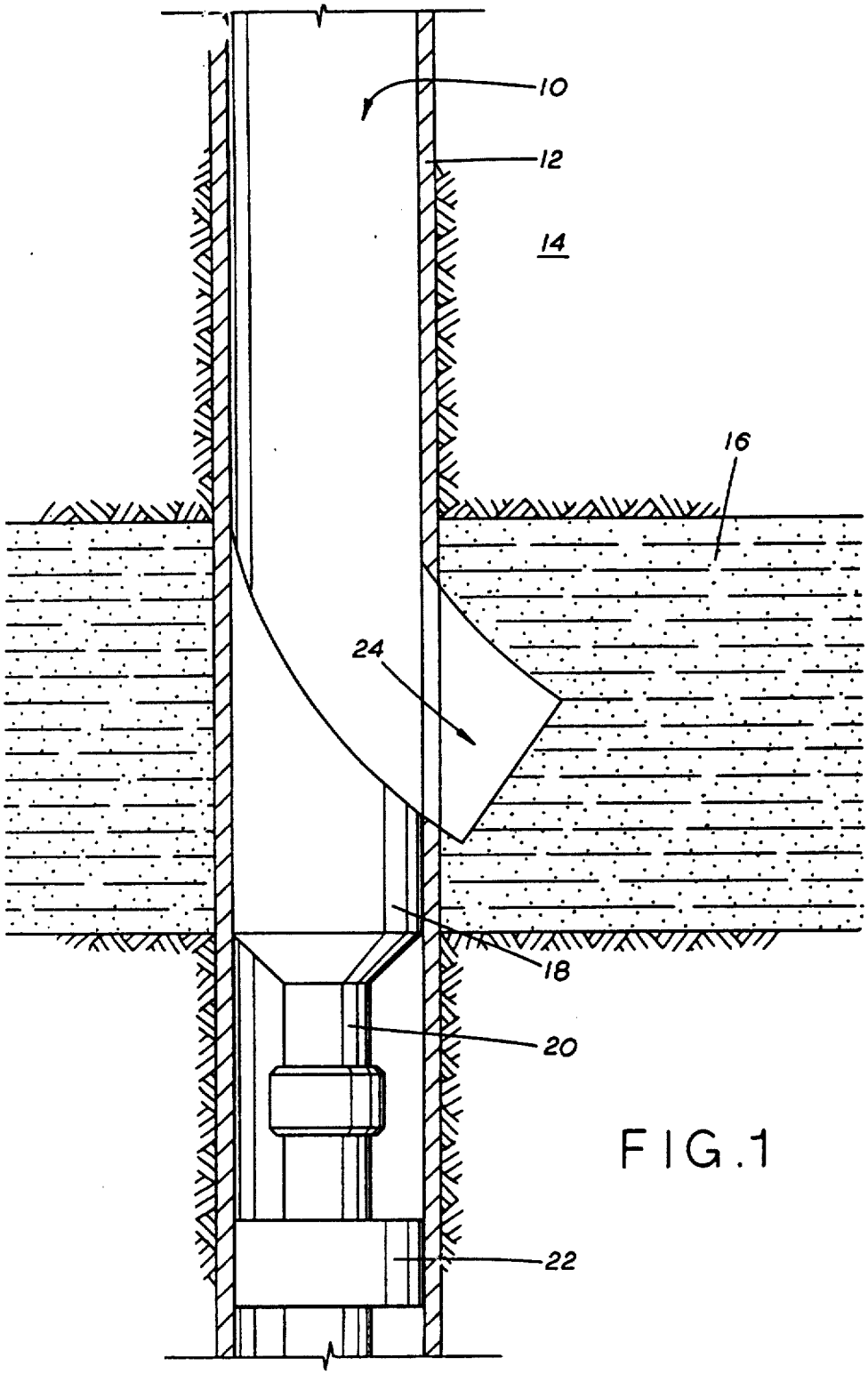
FIG. 1 is an elevational view, in cross section, of a cased earth borehole in which a deflection shoe has been used in conjunction with a casing window mill bit to cut a window in the casing in proximity to a targeted production zone.

Referring now to FIG. 1 of the drawings, an each borehole 10 having a steel casing 12 therein traverses the earth formations 14. Although not illustrated, the borehole 10 extends to the earth's surface. Based upon an evaluation of these earth formations 14 through the use of conventional seismic prospecting methods, taken in conjunction with well logging data, the zone 16 has been targeted for lateral drilling. Through the use of lateral drilling, a horizontal well can be drilled through the producing zone 16, allowing the formation to be drained into a horizontal well bore that extends into the reservoir at a depth, where a maximum output can be achieved over a specific length of time in order to obtain either a quick return on investment, or extend or increase the producing life of a reservoir.

Although not illustrated in FIG. 1, once the depth of the targeted production zone 16 has been fully identified, a conventional deflection shoe 18 is run into the earth borehole 10 on a tubing string 20 which can be anchored to the casing 12 through means of a conventional anchor or an inflatable packer 22. The setting of the deflection shoe 18 is well known in the art, for example, as shown in U.S. Pat. No. 4,266,621 which is incorporated herein by reference. The well casing window mill bit which is shown in that same patent can be run into the well on a conventional drill string to mill out the window 24 in the casing 12 in proximity to the targeted formation 16. As illustrated in FIG. 1, once the window has been cut through the casing, the conventional drill string and casing window mill bit are removed from the borehole 10.

Figure 2:
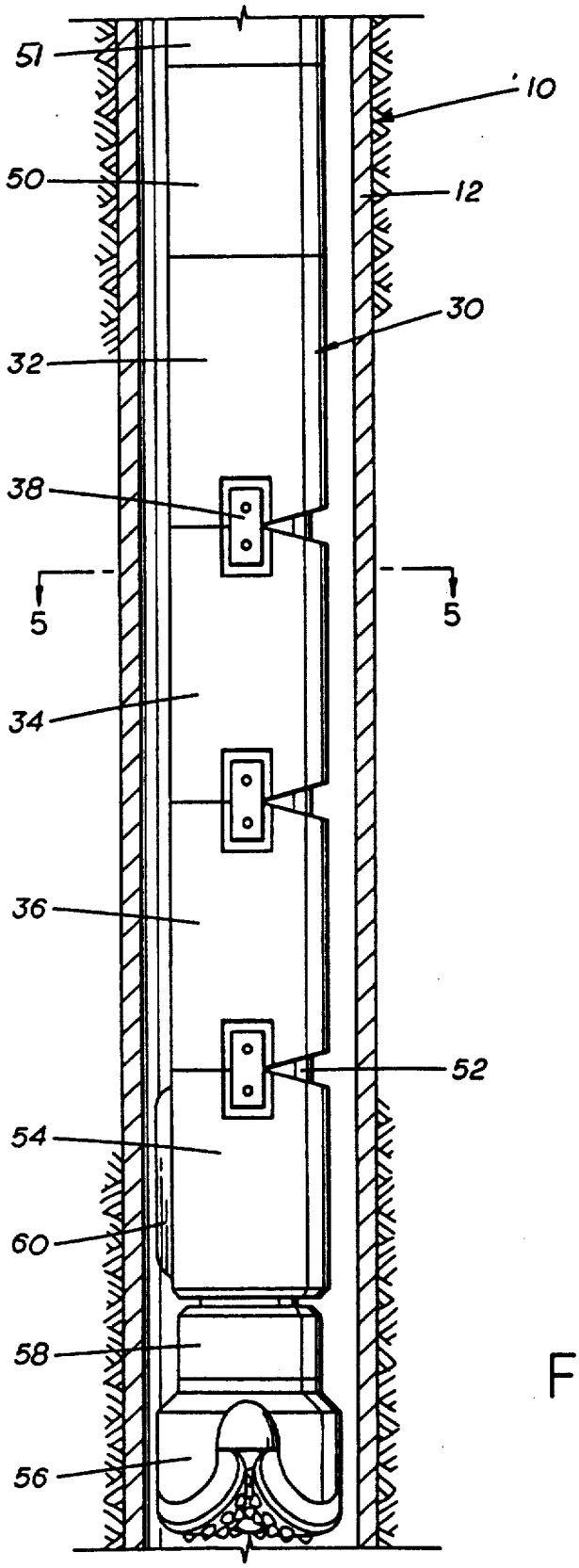
FIG. 2 is an elevational view of a drill string in accordance with the present invention, shown traversing a cased earth borehole prior to encountering the deflection shoe in FIG. 1.
Figure 10:
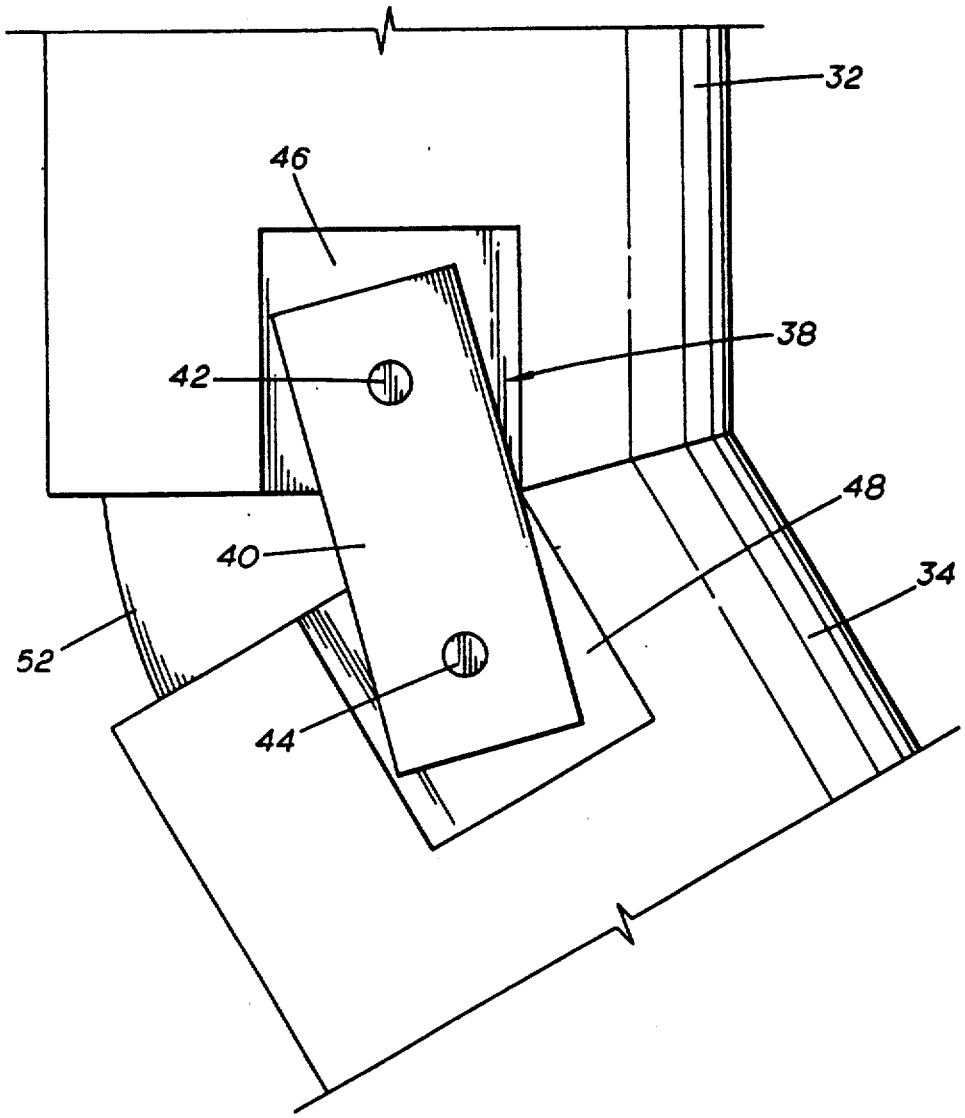
FIG. 10 is a schematic view of portions of two sections of the drill string according to the present invention, showing in greater detail the strap and boxes used to hold the sections together.

Referring now to FIG. 2, there is illustrated a drill string in accordance with the present invention which is run into the earth borehole 10 of FIG. 1 subsequent to the removal of the drill string bearing the casing window mill bit. The drill string 30 is made up of a plurality of drill string sections 32, 34 and 36. In putting together an actual drill string, the present invention contemplates the use of as many of these sections as is required to build up the desired angle. For example, if the angle between two sections is 3°, and a 90° total angle is desired, there will be thirty-one of these sections. The sections are held together through pairs of latches, for example, two latches, such as the latch 38 which holds together the sections 32 and 34. Latch 38 is shown in greater detail in FIG. 10 and includes a metal strap 40 pivotally connected to the pins 42 and 44 with pin 42 being an integral part of the section 32 and pin 44 being an integral part of section 34. The strap 40 can pivot within the U-shaped sections 46 and 48 which are sized slightly larger than the width of the strap 40. If desired, the straps 40 can be U-shaped in cross section for additional strength.

Referring again to FIG. 2, it should be appreciated that the latches 38 are preferably arranged in pairs. Thus, there would be another identical latch on the opposite side of the drill string from the latch 38 as illustrated.

Within the interior of the sections 32, 34 and 36 and also within the hang-off sub 50 runs a continuous, steel-lined, neoprene high pressure hose 52 which transports the drilling mud. The hose 52 is latched on its top end to the hang-off sub 50 with its bottom end latched to the bearing sub 54. A conventional drill bit 56 is threaded into a bit box 58 which is rotatably mounted within the bearing sub 54. A conventional small kick stabilizer 60 is mounted on the side of the bearing sub 54 opposite the direction in which the drill string will ultimately be drilling.

Figure 3:
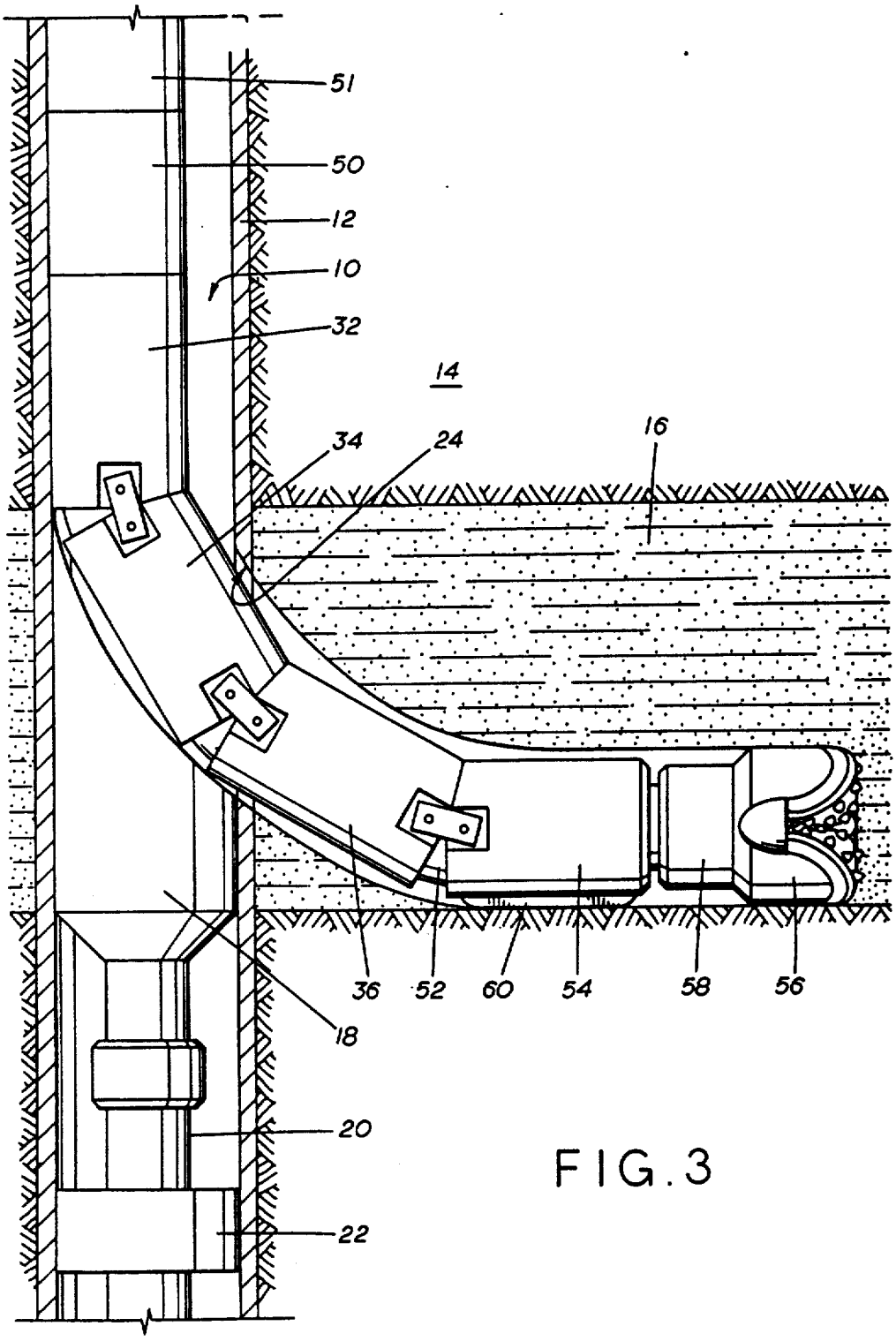
FIG. 3 is a schematic view of the drill string illustrated in FIG. 2, shown continuing to drill the targeted production zone after having contacted the deflection shoe illustrated in FIG. 1.

Referring now to FIG. 3, there is illustrated schematically the drill string illustrated in FIG. 2 having encountered the diverter shoe 18, passing through the window 24 in the casing 12 and continuing to drill into the targeted zone 16. It should be appreciated that the sections 32, 34 and 36 can only pivot in the direction as illustrated. The deflection shoe 18 preferably has an angle of deflection equivalent to the angle capability of the drill string in accordance with the present invention. Drilling off from the face is achieved by rotating the bit 56 through the use of a conventional positive displacement mud motor (FDM) 51 in the drill string which is arranged through the hang-off sub 50 to drive the drill bit 56 through a flexible drive shaft. As the drill bit 56 passes through the window 24 and commences drilling, the drill string assembly will fold into the desired bend and will drill off the deflection face. The starting angle, through the small kick stabilizer 60 on the low side of the bearing sub 54 will increase as more weight is added, due to the formation interference that will now act as a deflection wedge itself. The drilling will continue until the total desired angle is obtained. At specific intervals as desired, the assembly will be withdrawn, the hole surveyed and re-entered until a conventional type of flexible rotary drilling string is reinserted to continue the horizontal path, if desired.

Figure 4:
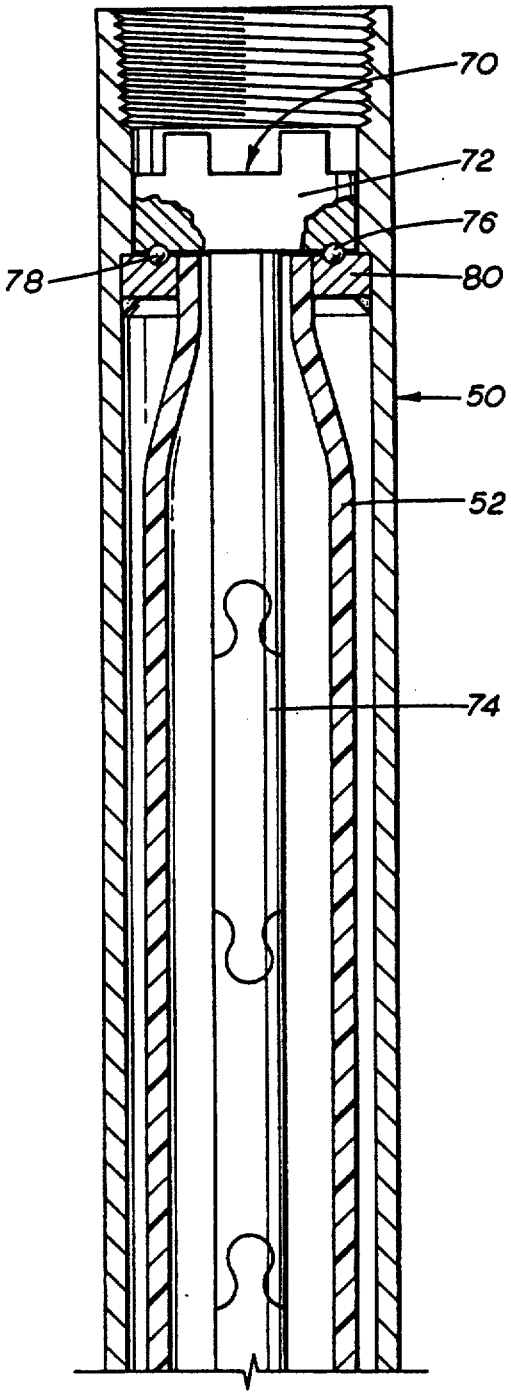
FIG. 4 is an elevated view, partially in cross section, of the hang-off sub portion of the drill string illustrated in FIG. 2, illustrating a portion of the high pressure mud hose the flexible drive shaft.

Referring now to FIG. 4, there is illustrated in cross section the hang-off sub 50. The PDM downhole motor 51 (not illustrated in FIG. 4) threads into the upper portion of the hang-off sub 50 and will have a drive shaft which mates with the shaft box 70. The transfer axle 72 is mounted on top of the articulated, flexible drive shaft 74. The downward weight is carried through a ball bearing system 76 and 78 carried by the hang-off ring 80. Again it should be appreciated that the PDM motor 51 to be used with the hang-off sub 50 is conventional and will have a standard pin and box connection for mating with the box connection at the top end of the hang-off sub 50. The continuous, steel-lined, neoprene, high pressure hose 52 is also connected to the ring 80. The axial flow velocity of the drilling mud through the hose 52 can be controlled, if desired, by controlling the openings (not illustrated) in the transfer axle 72. It should be appreciated that the lower end of the hang-off sub 50 can either be threadedly engaged with the top section 32 or can be held onto section 32 through the use of a strap 38 if desired.

Figure 5:
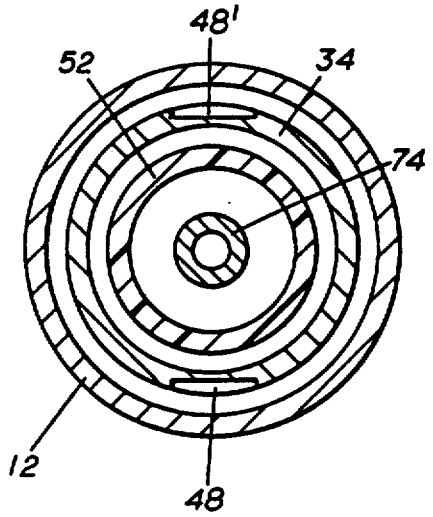
FIG. 5 is a cross-sectional view taken along the section lines 5—5 of FIG. 2.

FIG. 5 illustrates a cross-sectional view taken along the section lines 5—5 of FIG. 2. It should be appreciated that the outer shell of the cylindrical section 34 surrounds the high pressure hose 52 which in turn surrounds the flexible drive shaft 74. On opposite sides of the shell of the section 34 there are located the U-shaped boxes 48 and 48' for holding the latch 40 (not illustrated in this figure).

Figure 6:
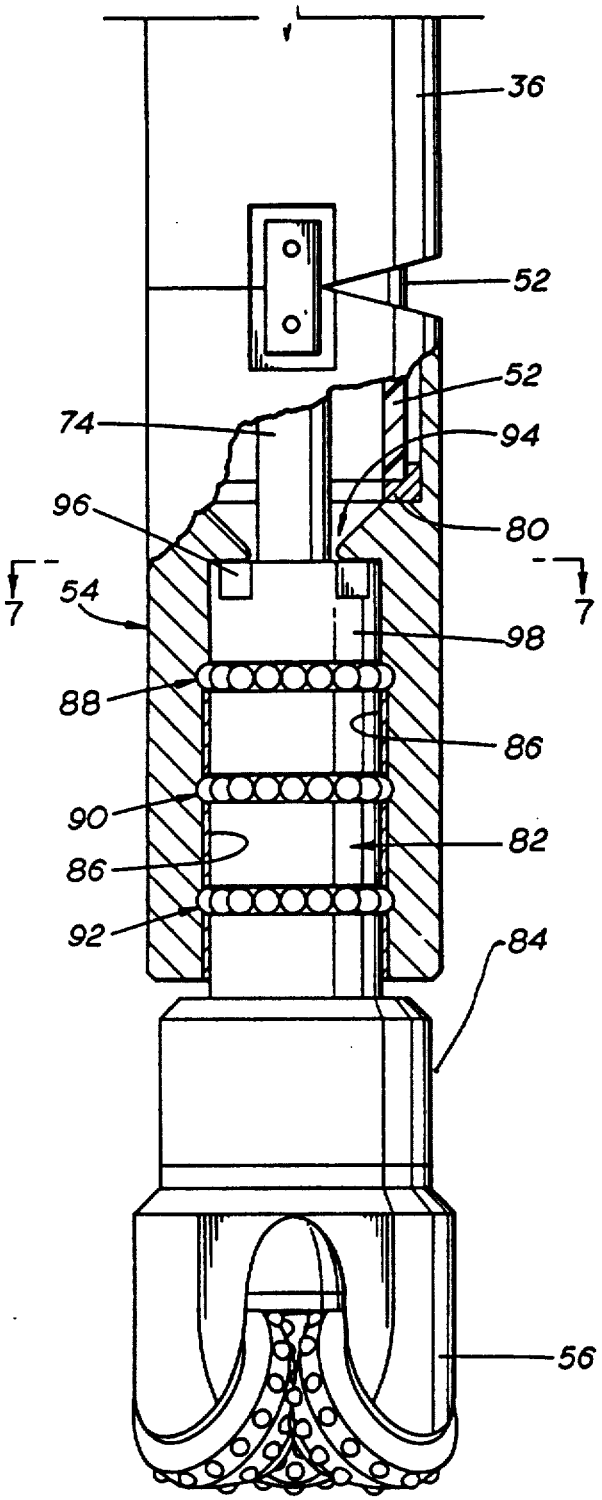
FIG. 6 is a schematic view, partially in cross section, of the lower end of the drill string illustrated in FIG. 2, illustrating the bearing sub into which the drill bit box is rotatably mounted.
Figure 7:
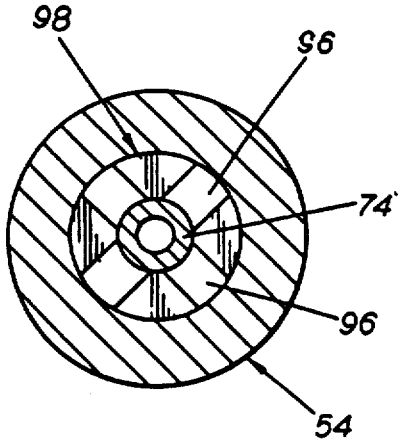
FIG. 7 is a top plan view of the connection junction between the drill bit box and the flexible drive shaft.

Referring now to FIG. 6 there is illustrated in greater detail the bearing sub 54. Bearing sub 54 is latched to the section 36 by a latch member similar to latch 38. A hose connector 80 connects the bottom end of the hose 52 to the body of the bearing sub 54. The drill bit box 82 into which the drill bit 56 is threadedly connected is [retained in] *rotatably mounted relative to* the fixed body 84 by radial bearings 86 and three rows of retainer thrust bearings 88, 90 and 92. These bearings are lubricated through mud flow that is allowed to flow through the flow restrictor 94. The drive shaft 74 is inserted into the grooved connections 96 (see FIG. 7) of the drive shaft retaining ring 98 shown in FIGS. 6 and 7.

In the operation of the embodiment shown in FIGS. 4 and 6, it should be appreciated that as the PDM motor (not illustrated in these figures) causes the transverse axle 72 to rotate the flexible drive shaft 74, which in turn is connected at its lower end through the retaining ring 98 to the bit box 82 which causes the bit 56 to rotate. As drilling fluid passes through the PDM and through the transverse axle 72, it enters the high pressure hose 52 and exits at the lower end of the hose through the flow restrictor 94, through the retaining ring 98 to the interior of the bit box 82 and hence to the interior of the drill bit 56 for exit therefrom in the conventional manner.

Figure 8:
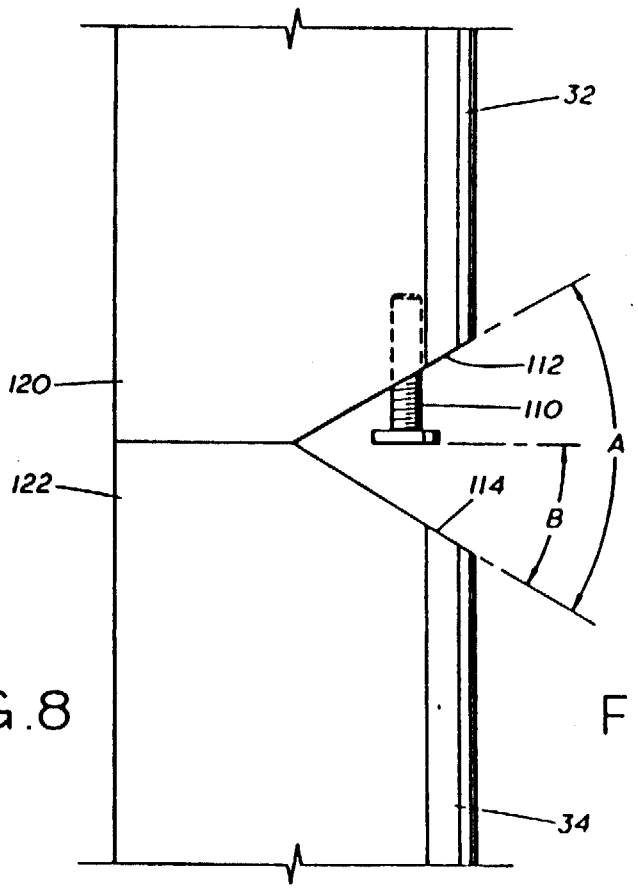
FIG. 8 is a schematic view of one embodiment of the apparatus used to vary the preset angle of the drill string.

Referring now to FIG. 8, there is illustrated schematically a method and apparatus for varying the angle between the sections 32 and 34. For ease of illustration, the latch mechanism between theses two sections is not illustrated in FIG. 8. If it were not for the bolt 110, the lower beveled edge 112 of section 32 would form a given angle A with the upper beveled edge 114 of section 34. The angle A between lines 112 and 114 is preferably maintained at 3°. By using a threaded bolt 110, threaded into the surface 112, the surface 114 can only rotate through the angle B which is coincident with the head of the bolt 110. Thus, by varying the distance into which the bolt 110 travels into surface 112, the angle achieved will vary preferably between 0.5° and 3°. Alternatively, steel pegs of predetermined length can be driven into holes in the surfaces, with a predetermined portion of each such peg protruding from the surface.

Figure 9:
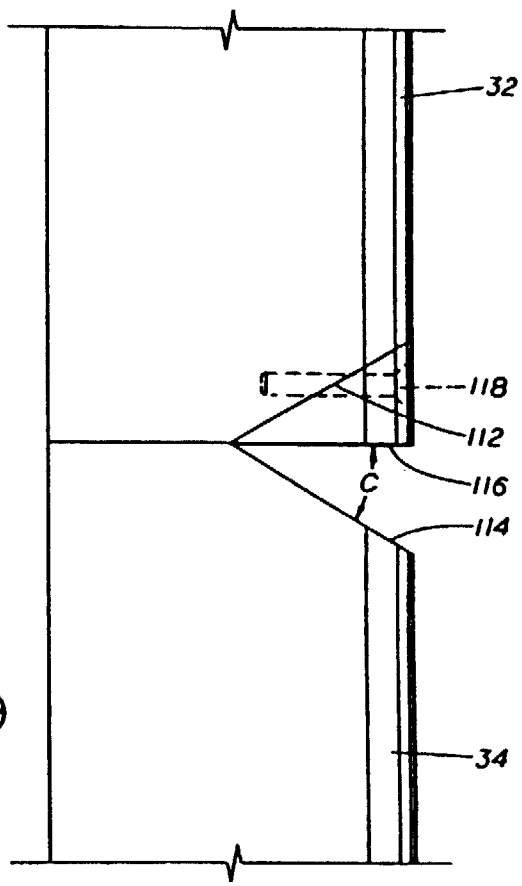
FIG. 9 is a schematic view of an alternative embodiment of the apparatus used to vary the preset angle of the drill string.

FIG. 9 illustrates schematically an alternative embodiment for changing the angle between the surfaces 112 and 114. By using a wedge-shaped member 116 attached to the upper surface 112 with a bolt 118, the angle C can be selected to be any value between zero (by having the wedge shape 116 also touch the surface 114), up to approximately 3°.

The preferred embodiments contemplate that both the upper and lower surfaces of the sections be beveled such that a V shape is formed between the adjacent surfaces. However, it should be appreciated that both surfaces need not be beveled. For example, as illustrated in FIG. 9, the wedge-shaped section 116 could be integrally formed with the section 32 and only have the surface 114 be beveled. Conversely, the top of section 34 could be flat, i.e., not beveled, and only have the surface 112 be beveled. Moreover, while the preferred embodiment of the invention contemplates that the angles between adjacent sections be the same throughout the curved section, the angles can be different, if desired. For example, the angle between sections 32 and 34 might be set at 3°, and the angle between sections 34 and 36 could be set at 2°, etc.

Thus, it should be appreciated that there has been described and disclosed herein a drill string system which allows a vertical well bore to be re-entered while being lowered vertically, and with a controlled flexibility to drill a curve up to 90° and even further. The system is designed such that no rotation is required to the main body of the string. Other variations of the preferred embodiments will become apparent to those skilled in the art from a reading of the foregoing description. For example, although the preferred embodiment contemplates the use of a diverter shoe to cause the drill string to pass out through a window in the casing, those skilled in the art will recognize that a similar diverter shoe can be anchored in an open hole and thus allow the drill bit and related drill string to drill directly into the formation from the open hole. The system described herein allows the non-rotating drill string to bend in only a single direction. As illustrated in FIG. 8, the section 34 can rotate with respect to the section 32 only in the direction which decreases the angle A during bending, since the non-beveled surface area 120 on the lower side of section 32 is parallel and already touching the surface portion 122 on the upper end of section 34. Thus, as best illustrated in FIG. 2, when it is desired that the drill string bend to the right, the beveled portions of the sections are maintained on the right-hand side of the well bore. Conversely, when it is desired that the drilll string bend to the left, the beveled sections will be maintained on the left-hand side of the well bore.

What is claimed is:

1. A drill string for drilling a curved borehole, wherein said drill string has a plurality of cylindrical sections, each of said sections having a longitudinal axis and also having an upper end and a lower end, comprising:

a first of said drill string sections having first and second surfaces on the said lower end of said first section; and a second of said drill string sections having first and second surfaces on the said upper end of said second section, said first surfaces being parallel to each other and perpendicular to each said longitudinal axis and an angle being formed between said second surfaces.

2. A drill string for drilling a curved borehole, wherein said drill string has a plurality of cylindrical sections, each of said sections having a longitudinal axis and also having an upper end and a lower end, comprising:

a first of said drill string sections having first and second surfaces on the said lower end of said first section;

a second of said drill string sections having first and second surfaces on the said upper end of said second section, wherein said first surfaces are parallel to each other and perpendicular to each said longitudinal axis and a first angle exists between said second surfaces while said drill string is being lowered vertically, and when said drill string is in the process of drilling a curved borehole, the said second surfaces are parallel and a second angle exists between said first surfaces.

3. The drill string according to claim 2 including, in addition thereto, means to vary said first angle.

4. A drill string for drilling a curved borehole, wherein said drill string has a plurality of cylindrical sections, each of said sections having a longitudinal axis and also having an upper end and a lower end, comprising:

a first of said drill string sections having first and second surfaces on the said lower end of said first section;

a second of said drill string sections having first and second surfaces on the said upper end of said second section, wherein said first surfaces are parallel to each other and perpendicular to each said longitudinal axis and a first angle exists between said second surfaces while said drill string is being lowered vertically, and while said drill string is in the process of drilling a curved borehole, the said first angle is reduced and a second angle is formed between said first surfaces.

5. The drill string according to claim 4 including, in addition thereto, means to vary the amount the said first angle is reduced.

6. A drilling system for drilling a curved borehole, comprising:

a drill string having a plurality of independent cylindrical sections pivotally connected together;

a PDM motor in said drill string;

a drill bit in said drill string;

a steel-lined neoprene hose for delivering drilling fluid from said motor to said drill bit; and a flexible drive shaft connected between said motor and said drill bit, said independent sections having the ability to bend only in a single direction while said system is drilling said curved borehole.

7. The system according to claim 6 wherein said independent sections are pivotally connected together with pairs of latch assemblies, each of said latch assemblies comprising a metal strap enclosed within a latch box having a slightly larger width than the width of said strap, each said strap being pivotally connected to two of said plurality of sections.

8. A drilling system for drilling a curved borehole, comprised of a drill string having a first location and a second location, and having independent sections therebetween, a PDM motor in the first location of said drill string, and a drill bit in the second location of said drill string, a flexible pressure hose interior of said independent sections and connected between said PDM motor and said drill bit and a flexible drive shaft interior of said pressure hose connected between said PDM motor and said drill bit, said independent sections having the ability to bend in only a single direction while said system is drilling said curved borehole.

*9. A drilling system for drilling a curved borehole, comprising:*

*a drill string including a plurality of tubular members connected together and having an interior flow path for transmitting pressurized fluid;*

*a fluid-driven motor having a drive shaft within the drill string;*

*a drill bit at an end of the drill string;*

*a plurality of cylindrical sections spaced within the drill string between the motor and the drill bit, the plurality of cylindrical sections pivotally connected together to*

*bend only in a single direction while the system is drilling a curved borehole;*

*a flexible pressure hose interior of the plurality cylindrical sections for delivering pressurized fluid from the motor to the drill bit; and*

*a flexible shaft positioned within the pressure hose and mechanically interconnected the drill bit to the motor drill shaft.*

*10. The drilling system as defined in claim 9, wherein;*

*each of the plurality of cylindrical sections has a longitudinal axis, an upper end, and a lower end;*

*a first of the cylindrical sections having its upper end connected to the fluid driven motor and having first and second surfaces on its lower end; and*

*a second of the cylindrical sections having first and second surfaces on its upper end, wherein the first surfaces are parallel to each other and perpendicular to each of the longitudinal axes and a first angle exists between the second surfaces while said drill string is being lowered vertically, and when the system is drilling the curved borehole the first angle is reduced and a second angle is formed between the first surfaces.*

*11. The drilling system as defined in claim 10, further comprising:*

*adjusting means to vary the reduction of the first angle.*

*12. A system as defined in claim 9, wherein one of said plurality of cylindrical sections is a bearing sub, the bearing sub houses a plurality of bearings, and the plurality of bearings include radial bearings and thrust bearings.*

*13. A drilling system as defined in claim 12, further comprising:*

*a flow restrictor for diverting pressurized fluid to lubricate the plurality of bearings.*

*14. A drilling system as defined in claim 12, further comprising:*

*the bearing sub is the lowermost of the plurality of cylindrical sections.*

*15. A drilling system as defined in claim 12, wherein a lower end of the flexible pressure hose terminates within the bearing sub at a position axially above the plurality of bearings.*

*16. A drilling system as defined in claim 9, further comprising:*

*a pair of latch assemblies for pivotably connecting the cylindrical sections together, each of the latch assemblies including a metal strap enclosed within a latch box having a slightly larger width than the width of the corresponding strap, each strap being pivotably connected to two of the plurality of cylindrical sections.*

*17. A drilling system as defined in claim 9, wherein the fluid-driven motor is a positive displacement mud motor.*

* * * * *